United States Patent
Delprat

Patent Number: 5,497,396
Date of Patent: Mar. 5, 1996

[54] METHOD OF TRANSMITTING DATA BETWEEN COMMUNICATION EQUIPMENTS CONNECTED TO A COMMUNICATION INFRASTRUCTURE

[75] Inventor: Marc Delprat, Le Chesnay, France

[73] Assignee: Societe Dite Alcatel N.V., Amsterdam, Netherlands

[21] Appl. No.: 175,556

[22] Filed: Dec. 30, 1993

[30] Foreign Application Priority Data

Dec. 30, 1992 [FR] France .................................... 92 15932

[51] Int. Cl.⁶ .................. H04B 1/38; H04L 5/16
[52] U.S. Cl. .................. 375/220; 375/222; 375/377; 370/84
[58] Field of Search ........................ 375/7, 8, 121, 375/220, 222, 223; 370/84; 341/61

[56] References Cited

U.S. PATENT DOCUMENTS 4,924,480  5/1990  Gay et al. .................... 375/8

FOREIGN PATENT DOCUMENTS 2078768  9/1991  Canada .
9300778  6/1992  WIPO .

*Primary Examiner*—Stephen Chin
*Assistant Examiner*—Don Vo
*Attorney, Agent, or Firm*—Sughrue, Mion, Zinn, Macpeak & Seas

[57] ABSTRACT

At least one communication equipment connected to a communication infrastructure uses a first data coding format different from a second format used within the infrastructure which further comprises at least one data transcoder for converting data coded to the first format into data coded to the second format and vice versa. A transcoder is provided in the infrastructure in the vicinity of the connection to each of the equipments using the first format. The method of transmitting data between at least two of the equipments determines, on the basis of the data format used by each of the equipments between which data is to be transmitted, whether it is necessary to use a transcoder to transmit said data. If so, the transcoder nearest the equipment using the first format is activated so that the data is conveyed in a form coded to the second format in the infrastructure and changes from the first format to the second format or vice versa as close as possible to the equipment using the first format.

12 Claims, 1 Drawing Sheet

METHOD OF TRANSMITTING DATA BETWEEN COMMUNICATION EQUIPMENTS CONNECTED TO A COMMUNICATION INFRASTRUCTURE

BACKGROUND OF THE INVENTION

1. Field of the Invention

The present invention concerns a method of transmitting data between communication equipments connected to a communication infrastructure.

2. Description of the Prior Art

Throughout the following description the general term "data" refers to speech data or non-speech data such as data representing coded pictures.

The expression "communication equipment" refers to an equipment connected to the infrastructure by wires or by radio links (in which case the expressions "mobiles" and "mobile equipments" are used) or an interface connecting the infrastructure to an equipment or to another infrastructure.

In a conventional digital mobile radio system speech is transmitted in digitized form at a low bit rate, usually less than 10 kbit/s, by radio links between mobiles and base transceiver stations (BTS), called base stations for short, which provide the interface between the mobiles and a fixed infrastructure. The speech is coded using a format whose characteristics include the transmission bit rate. Each mobile has a speech coder/decoder (codec). The telecommunication infrastructures are also equipped with coders/decoders.

In professional mobile radio (PMR) systems many calls are set up between two mobiles or a group of mobiles via one or more base stations.

In these situations there are two options:

either to decode systematically the signal received at the base station, in which case speech is transmitted in the infrastructure at 64 kbit/s or in analog mode, i.e. in the infrastructure speech is coded with a format whose characteristics include the transmission rate employed or the transmission mode employed, this second format as used in the infrastructure being different from that used by the mobiles (note incidentally that the use of the expression "coder/decoder" to describe the devices used in the infrastructure to change the speech format is a misuse of language and that properly speaking these devices are transcoders), or not to use any coder/decoders within the infrastructure; if the mobiles involved in a call are all in the same cell associated with a base station, which is a relatively frequent situation in professional mobile radio, the infrastructure then serves simply as a "relay".

The former solution, which implies the systematic equipment of all base stations with transcoders, is unsatisfactory in terms of quality, efficiency and security of calls.

As any mobile to mobile call involves at least one transcoding operation, namely decoding from the coding format used by the mobiles to the coding format used in the infrastructure, followed by coding from the format used in the infrastructure to the format used by the mobiles, the quality of the call is degraded. What is more, this transcoding of the speech busies unnecessarily physical lines internal to the infrastructure as the speech is conveyed at 64 kbit/s. Furthermore, this solution cannot provide encrypted end to end communication and so does not offer the facility of secure communications between mobile equipments or between the latter and wired equipments connected to the infrastructure.

The second solution, which regards the network as merely a relay for calls between mobiles when the latter are in the same cell, has the drawback that it does not provide for connection to standard telephone equipments including wired terminals and PABX type equipments.

An object of the present invention is to remedy these drawbacks by proposing a method for transmitting data between communication equipments (mobiles, wired terminals, PABX type equipments, etc) connected to a communication infrastructure which optimally processes calls between equipments using a data coding format identical to that used in the infrastructure and equipments which can use a data coding format different from that used in the infrastructure.

SUMMARY OF THE INVENTION

The present invention consists in a method of transmitting data between communication equipments connected to a communication infrastructure, at least one of said equipments being adapted to use a first data coding format different from a second format used within said infrastructure which further comprises at least one data transcoder for converting data coded to said first format into data coded to said second format and vice versa, in which method a transcoder is provided in said infrastructure in the vicinity of the connection to each of the equipments using said first format and said method comprises the following steps for each transmission of data between at least two of said equipments:

determining on the basis of the data format used by each of said equipments between which data is to be transmitted whether it is necessary to use a transcoder to transmit said data, and if so, activating the transcoder nearest the equipment using said first format so that said data is conveyed in coded form to said second format in the infrastructure and changes from said first format to said second format or vice versa as close as possible to the equipment using said first format.

Using the method of the invention improves the average quality of communication by avoiding any unnecessary transcoding with a substantial saving in terms of physical links in the case of application of the invention to a mobile radio system because the speech is conveyed in a form coded to the coding format used by the infrastructure and by the mobile equipments within the infrastructure.

The method in accordance with the invention is particularly advantageous when the first and second formats differ in terms of their data coding bit rate characteristic, the bit rate of the second format being lower than that of the first format.

According to the invention, no transcoder is activated when data is transmitted between two mobile equipments using the same format, the data being conveyed in a form coded to the second format within the infrastructure. This is advantageous.

If data is transmitted between a mobile equipment using the second format and an external equipment connected by wires to the infrastructure and using the first format, the transcoder chosen is that at the point where the equipment is connected to the infrastructure or as close as possible to the connection point. In the case of transmission of encrypted data, no transcoder is chosen and the data is conveyed in coded form within the network with the result that the communication can remain encrypted from end to end.

An infrastructure for implementing the method according to the invention has first means for determining on the basis of the data format used by each of the equipments between which the data is transmitted whether it is necessary to use a transcoder to transmit the data and second means for activating the transcoder nearest the equipment using the first format if it is necessary to use a transcoder.

The infrastructure may include base transceiver stations connected to a processing and switching center connected to or including interfaces for communication between the infrastructure and external equipments connected by links using the first format to the infrastructure, and the transcoders are within the interfaces.

If the base transceiver stations are connected directly to communication equipments by links using the first format, they are equipped with transcoders. In this case the first and second means may be included in each base transceiver station, the latter further including databases holding the characteristics of the resident and visitor mobiles needed for the purposes of the determination carried out by the first means.

Other features and advantages of the invention emerge in the following description given by way of nonlimiting example with reference to the appended drawings.

DETAILED DESCRIPTION OF THE INVENTION

Figure 1:
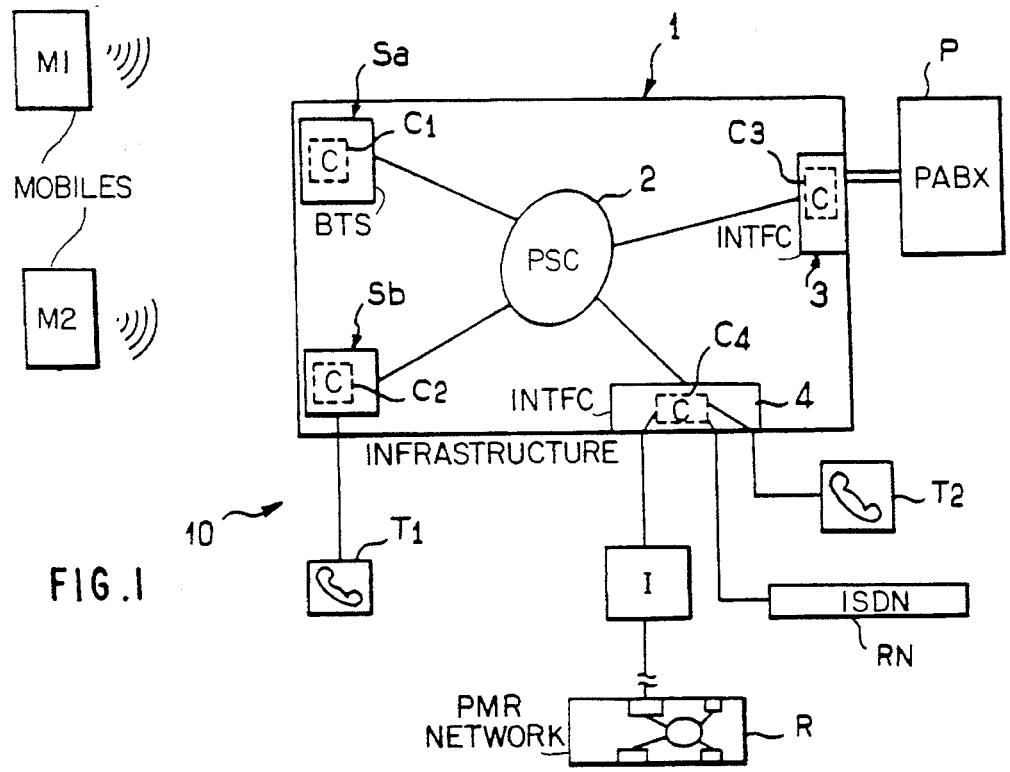
FIG. 1 is a block diagram of a mobile communication system having a communication infrastructure implementing the method according to the invention.

Referring to FIG. 1, one embodiment of the method according to the invention is described in the context of a mobile communication system 10, for example a professional mobile radio network, including mobile transceiver equipments M1, M2 "connected" by radio links to a fixed communication infrastructure 1 including base transceiver stations Sa, Sb, a processing and switching center 2 and communication interfaces 3, 4 between the infrastructure 1 and external equipments connected by wires, for example a PABX P, a telephone terminal T2, a communication network RN, for example an ISDN (integrated services digital network) type network, and an intersystem interface I to another professional mobile radio network R. The base stations Sa, Sb each manage a radio cell and can also manage directly communications with equipments connected by wires such as a telephone T1, for example.

The base stations Sa, Sb and the interfaces 3, 4 are possible locations for the speech coders/decoders (transcoders) C1, C2, C3, C4 operative in this embodiment of the data transmission method according to the invention. These peripheral device locations can restrict transcoding operations to those situations in which they are truly indispensable, for example when one of the equipments concerned can accept only speech coded to a first format different from that used by the mobile equipments and within the infrastructure 1 (second format). In all cases in which the speech can be conveyed in a form coded to the second format within the infrastructure 11 the coders/decoders are not activated.

In practice it is possible to design an infrastructure having coders/decoders at "strategic" locations, namely within interfaces connecting the infrastructure 1 to external equipments via high bit rate (64 kbit/s or above) physical links, either digital or analog. It is also feasible to equip the base stations systematically with coders/decoders to enable direct access from these base stations to communication equipments such as ISDN networks.

The method according to the invention offers the facility of using and activating only the coder/decoder which is indispensable given the characteristics of the call.

Figures 2A, 2B, 2C:
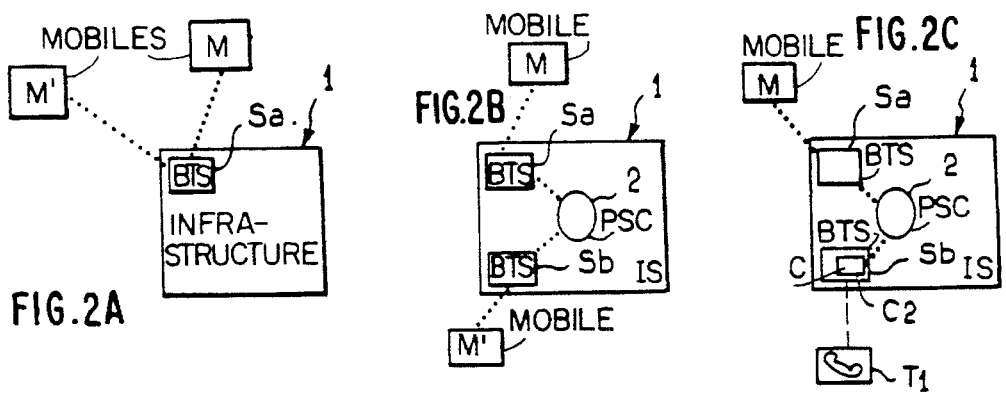
FIG. 2A–2F show six characteristic modes of transmitting data between a mobile equipment and communication equipments connected to the above-mentioned infrastructure.
Figures 2D, 2E, 2F:
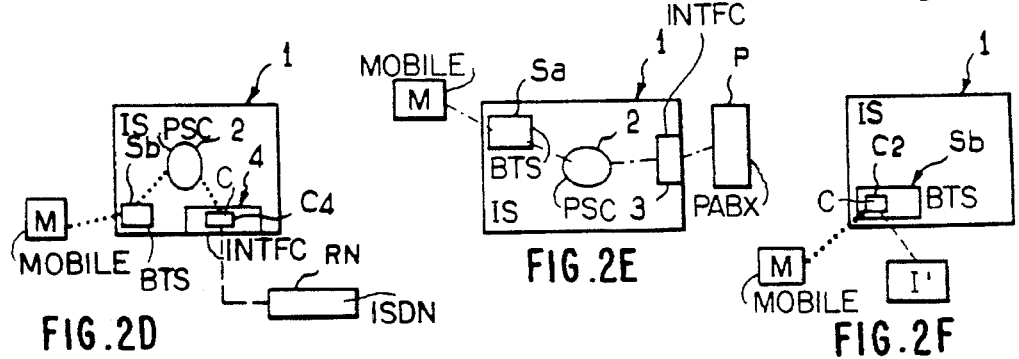

Referring to FIG. 2, which shows the main call configurations encountered in practice, a first configuration (2A) concerns a call (data transmission, and specifically speech transmission) between two mobile equipments M, M'. This call is an intracellular call as it involves only one base station Sa. In this first configuration the speech may be transmitted entirely in coded form (as symbolized throughout FIG. 2 by the use of dotted lines), i.e. to the coding format used by the radio infrastructure and the radio equipments (second format), the coding and decoding operations being carried out within the mobiles M, M' and the base station acting merely as a relay.

In a second configuration (2B) for exchange of speech between a mobile M geographically dependent on a first cell managed by a first base station Sa and a second mobile M' geographically dependent on a second cell managed by a second base station Sb, the speech can also be conveyed within the infrastructure 1 entirely in coded form and no coder/decoder is activated after the process which determines whether it is necessary to use a coder/decoder.

On the other hand, if a call is requested between a mobile M associated with a base station Sa and a wired telephone terminal T1 connected, for example, to a second base station Sb (see configuration 2C) a coding/decoding operation is needed at the second base station Sb and it is necessary to activate the coder/decoder C2 in this station. Thus using the method according to the invention the speech is conveyed in a form coded to the (second) format used by the infrastructure (below 10 kbit/s) within the infrastructure and is not "decoded", i.e. coded to the (first) format used by the external equipments (64 kbit/s or analog mode) until the last moment, when it becomes indispensable. The speech is conveyed between the base station Sb and the terminal T1 in "decoded" analog or digital form (shown in FIG. 2 by dotted lines).

Referring to FIG. 1, if an interface is shared by several equipments, for example an integrated services digital network RN, an intersystem interface I and a wired telephone terminal T2, the coder/decoder 4 can be shared on a time-sharing basis.

With reference to configuration (2D) if a call is initiated between a mobile M connected to the base station Sb and a network RN connected to the infrastructure 1 via the interface 4, a first part of the transmission is in coded form (that between the mobile M and the interface 4 via the base station Sb and the switching center 2) and a second part in decoded form (that between the interface 4 and the network RN), the coder/decoder C4 having been chosen and activated beforehand.

To transmit encrypted information between a mobile M and an external equipment P, or between two mobiles, no coder/decoder is activated on the transmission path (see configuration 2E). The call is therefore encrypted from end to end.

If direct access to an external equipment I' using the first data coding format, for example a telephone central office or a network) is provided from a base station Sb (see configuration 2F) a coder/decoder C2 must be provided in this base station.

More generally, the base stations must include a coder/decoder in all configurations providing direct access to one or more external equipments presupposing transmission of digital information coded to a coding format different from that used in the infrastructure.

If data is to be transmitted between a mobile equipment (M1 for example) connected to a base station belonging to the infrastructure 1 and one or more mobile equipments connected to a base station belonging to the communication infrastructure of the PMR network R (see FIG. 1) using the same data coding format as the infrastructure 1 then the data may be transmitted entirely in coded form from one infrastructure to the other and no coder/decoder is activated.

The method may be applied with advantage to professional mobile radio systems used by fleets of taxis, ambulances or police vehicles, for example, and is suitable for future digital systems to the TETRA European standard.

The coders/decoders to be activated within the infrastructure can be chosen either at the base stations using databases containing the characteristics of the resident and visitor mobiles needed to decide on the necessity of using a coder/decoder or at a central unit of the infrastructure.

The present invention is naturally not limited to the examples that have just been described and many modifications may be made to these examples without departing from the scope of the invention.

For example the method according to the invention may be applied to calls involving any equipment communicating with the network, regardless of the physical medium and the nature of the interfaces.

There is claimed:

1. Method of transmitting data between communication equipments connected to a communication infrastructure, at least one of said equipments being adapted to use a first data coding format different from a second format used within said infrastructure which further comprises at least one data transcoder for converting data coded to said first format into data coded to said second format and vice versa, in which method a transcoder is provided in said infrastructure in the vicinity of the connection to each of the equipments using said first format and said method comprises the following steps for each transmission of data between at least two of said equipments:

determining on the basis of the data format used by each of said equipments between which data is to be transmitted whether it is necessary to use a transcoder on a transmission path connecting said equipments between which data is to be transmitted, and if so, activating only the transcoder nearest the equipment using said first format so that said data is conveyed in a form coded to said second format in the infrastructure and changes from said first format to said second format or vice versa as close as possible to the equipment using said first format.

2. Method according to claim 1 wherein said first format and said second format differ in terms of their characteristic data coding bit rate, the bit rate of said second format being lower than the bit rate of said first format.

3. Method according to claim 1 wherein when said data is transmitted between two mobile equipments using said second format no transcoder is activated and said data is conveyed in a form coded to said second format within said infrastructure.

4. Method according to claim 1 wherein when said data is transmitted between a mobile equipment using said second format and an external equipment connected by wires to said infrastructure and using said first format the transcoder chosen is that located where said equipment is connected to said infrastructure or as close as possible to said connection point.

5. Method according to claim 1 wherein in the case of transmission of encrypted data no transcoder is chosen and said data is conveyed in coded form within said network.

6. Method according to claim 1, wherein a transcoder which is at a given location in said infrastructure and which is activated at the end of a determination process is adapted to be time-shared between a plurality of equipments connected to said infrastructure at this location.

7. Communication infrastructure for transmitting data between communication equipments which are connected to said infrastructure, at least one of said equipments being adapted to use a first data coding format different from a second data coding format used within said communication infrastructure, said communication infrastructure comprising:

(a) at least one transcoder for converting data coded to said second format into data coded to said first format and vice versa, said at least one transcoder being provided in the vicinity of a connection of an equipment using said first data coding format to said infrastructure, (b) first means for determining from the data coding format used by each of said equipments between which the data is transmitted whether it is necessary to use a transcoder to transmit said data, and (c) second means for activating only the transcoder nearest the equipment using said first format, when said first means determine that it is necessary to use a transcoder.

8. Infrastructure according to claim 7, further comprising a processing and switching center, to which are connected:

base transceiver stations; and interfaces for communications between said infrastructure, and the equipments which (1) use said first data coding format and (2) are connected by wires to said infrastructure;

wherein said at least one transcoder is located in one of said interfaces.

9. Infrastructure according to claim 8 wherein when said base stations are connected directly to communication equipments by links using said first format they are equipped with transcoders.

10. Infrastructure according to claim 8 wherein said first and second means are provided in each of said base stations which further comprise databases holding characteristics of resident and visitor mobiles needed for the determination process carried out by said first means.

11. A method of transmitting data between communication equipments, wherein:

said communication equipments include communication equipments using a first data coding format, and communication equipments using a second data coding format;

said communication equipments communicate via a common communication infrastructure, which (1) comprises transcoders and (2) uses said second data coding format;

said transcoders convert data between said first and said second data coding format; and a respective one of said transcoders is provided in a respective vicinity of each of said communication equipments using said first data coding format;

said method comprising the steps of:

a) determining whether use of one of said transcoders is required, on a transmission path between communicating ones of said communicating equipments, according to the following rules:

a-1) if data is to be communicated only between said communication equipments using said second data coding format, then use of one of said transcoders is not required;

a-2) if data is to be communicated between a communicating one of said communication equipments using said first data coding format and a another communicating one of said communication equipments using said second data coding format, then use of one of said transcoders is required;

b) if use of one of said transcoders is required, activating only a respective one of said transcoders which is nearest to said communicating one of said communication equipments using said first data coding format; and c) conveying said data to be transmitted to and from said communicating one of said communication equipments using said first data coding format via said activated respective one of said transcoders.

12. The method as set forth in claim 11, wherein said communication equipments are not codecs and are not transcoders.

* * * * *